(12) United States Patent
Swaffield et al.

(10) Patent No.: US 7,025,092 B2
(45) Date of Patent: Apr. 11, 2006

(54) POSITIVE AIR PRESSURE ATTENUATION DEVICE FOR DRAINAGE SYSTEMS

(75) Inventors: John Swaffield, Edinburgh (GB); David Campbell, Edinburgh (GB)

(73) Assignee: Studor S.A., Luxembourg (LU)

( * ) Notice: Subject to any disclaimer, the term of this patent is extended or adjusted under 35 U.S.C. 154(b) by 0 days.

(21) Appl. No.: 10/488,520

(22) PCT Filed: Sep. 4, 2002

(86) PCT No.: PCT/IB02/03577

§ 371 (c)(1),
(2), (4) Date: Aug. 16, 2004

(87) PCT Pub. No.: WO03/021049

PCT Pub. Date: Mar. 13, 2003

(65) Prior Publication Data

US 2004/0261870 A1  Dec. 30, 2004

(30) Foreign Application Priority Data

Sep. 6, 2001  (GB) .................................. 0121561

(51) Int. Cl.
*F16I 55/04*  (2006.01)
(52) U.S. Cl. ......................................... 138/30; 138/26
(58) Field of Classification Search .............. 138/30, 138/26, 27
See application file for complete search history.

(56) References Cited

U.S. PATENT DOCUMENTS

| | | | | | |
|---|---|---|---|---|---|
| 1,978,507 | A | * | 10/1934 | Rand | 4/211 |
| 2,755,820 | A | * | 7/1956 | Taylor | 138/26 |
| 2,808,070 | A | * | 10/1957 | Malsbary | 138/26 |
| 3,209,785 | A | * | 10/1965 | Mercier | 220/530 |
| 3,296,583 | A | * | 1/1967 | Chatten et al. | 367/141 |
| 3,348,578 | A | * | 10/1967 | Mercier | 138/30 |
| 3,370,544 | A | * | 2/1968 | Thorpe, Sr. | 417/44.2 |
| 3,394,733 | A | * | 7/1968 | Jacuzzi | 137/565.34 |
| 3,406,722 | A | * | 10/1968 | Ruth | 138/30 |
| 3,508,677 | A | * | 4/1970 | Laibson et al. | 220/590 |
| 3,625,242 | A | * | 12/1971 | Ostwald | 138/30 |
| 4,186,775 | A | * | 2/1980 | Muroi | 138/30 |
| 4,232,708 | A | | 11/1980 | Miller | |
| 4,336,904 | A | | 6/1982 | Jardinier et al. | |
| 4,340,079 | A | * | 7/1982 | Smith et al. | 137/207 |
| 4,524,795 | A | | 6/1985 | Ericson et al. | |

(Continued)

FOREIGN PATENT DOCUMENTS

DE   3801036   7/1988

(Continued)

*Primary Examiner*—James Hook
(74) *Attorney, Agent, or Firm*—Hovey Williams LLP

(57) ABSTRACT

The positive air pressure attenuation device (1) for use in drainage systems in buildings includes a housing (3), connected to the system, to which a flexible reservoir (10) is secured, the flexible reservoir (10) being operable on a positive air pressure transient within the drainage system, wherein both the housing (3) and the flexible reservoir (10) are contained within an external casing (2).

20 Claims, 4 Drawing Sheets

U.S. PATENT DOCUMENTS

| | | | |
|---|---|---|---|
| 4,535,807 A | | 8/1985 | Ericson |
| 4,545,398 A | * | 10/1985 | van Olst .................. 137/216.2 |
| 4,732,176 A | * | 3/1988 | Sugimura .................... 138/30 |
| 4,794,955 A | * | 1/1989 | Ejima et al. .................. 138/30 |
| 4,867,802 A | * | 9/1989 | Earl .......................... 137/526 |
| 5,036,879 A | * | 8/1991 | Ponci ........................ 137/496 |
| 5,860,452 A | * | 1/1999 | Ellis ............................ 138/30 |
| 6,328,071 B1 | * | 12/2001 | Austin ........................ 138/30 |
| 6,672,337 B1 | * | 1/2004 | Kobayashi et al. ........... 138/30 |
| 2002/0059959 A1 | * | 5/2002 | Qatu et al. ..................... 138/30 |

FOREIGN PATENT DOCUMENTS

| | | |
|---|---|---|
| EP | 278746 | 2/1988 |
| GB | 2306179 | 10/1995 |
| GB | 2310701 | 3/1996 |

\* cited by examiner

POSITIVE AIR PRESSURE ATTENUATION DEVICE FOR DRAINAGE SYSTEMS

BACKGROUND OF THE INVENTION

1. Field of the Invention

This invention relates to a positive air pressure attenuation device for relieving positive pressure transients in drainage or sewage systems.

2. Description of the Prior Art

In such drainage systems, and in particular in buildings having more than three levels, the use of air admittance valves are required to prevent the release of foul air, and to admit air under conditions of reduced pressure (negative pressure) in the discharge pipes and stacks. Such valves are disclosed f.i. in patent documents GB 2.014.697, EP 0 084 303, EP 0 278 746 or EP 1 026 329.

However, the use of these valves prevent positive air pressure transients, arising within the drainage system, from escaping to the atmosphere, leading to a reduced performance of the drainage system.

Patent documents EP 0 172 966 and EP 0 661 483 disclose sewer relief valves which automatically open responsive to overpressure due to a back flow of sewage and drain water within a plumbed drainage system.

According to these embodiments however, the overpressure is relieved or attenuated by expelling air from the sewage system into the atmospheric air.

Such positive air pressure transients should be temporary attenuated within the system without expelling foul air from the system into the surrounding atmosphere.

SUMMARY OF THE INVENTION

According to the present invention, there is provided a positive air pressure attenuation device for use in a drainage system comprising a housing to which a flexible reservoir is secured, the flexible reservoir being operable on a positive air pressure transient within a drainage system, and both the housing and the flexible reservoir are contained within an external housing.

Preferably, the housing has an inlet and an outlet, the inlet being connected to the drainage system, and the outlet is connected to a cap to enable sealing of the housing The housing is fabricated from a rigid material to ensure adequate sealing of the complete unit. The housing is a continuous unit over which the flexible reservoir is fitted. Where the flexible reservoir covers the housing, means for ventilation are used to allow air from the drainage system to pass freely to and from the interior periphery of the reservoir. A suitable material for the housing would be PVC, for example.

The flexible reservoir is contained within the external casing, and sealed to both the inlet and outlet of the housing by means of an 'O' ring or other elastomeric fastener coupled a suitable sealant, for example, an uncured paste of butyl rubber and solvent. The 'O' ring compresses the flexible reservoir onto the inlet or outlet surface onto the butyl rubber paste to effect a complete seal. A suitable material for the flexible reservoir would be f.i. a 0.2 mm thick butyl rubber.

An external casing that has means for ventilation to the atmosphere in its base surrounds the flexible reservoir. The external casing may be constructed from rigid materials such as PVC.

In one embodiment, the positive air pressure attenuation device may be used as a single or 'stand alone' unit. In another embodiment, the outlet of the positive air pressure attenuation device be connected to the inlet of another positive air pressure attenuation device when extra capacity is required, in a further embodiment, the positive air pressure attenuation device or devices may be used in conjunction with an air admittance valve to increase the overall performance of the drainage system.

Particularities and essential elements of the device according to the present invention will be put forward in the annexed set of claims.

The present invention will now be described by way of example only, with reference to the following drawings in which:

DESCRIPTION OF THE PREFERRED EMBODIMENTS

Figure 1:
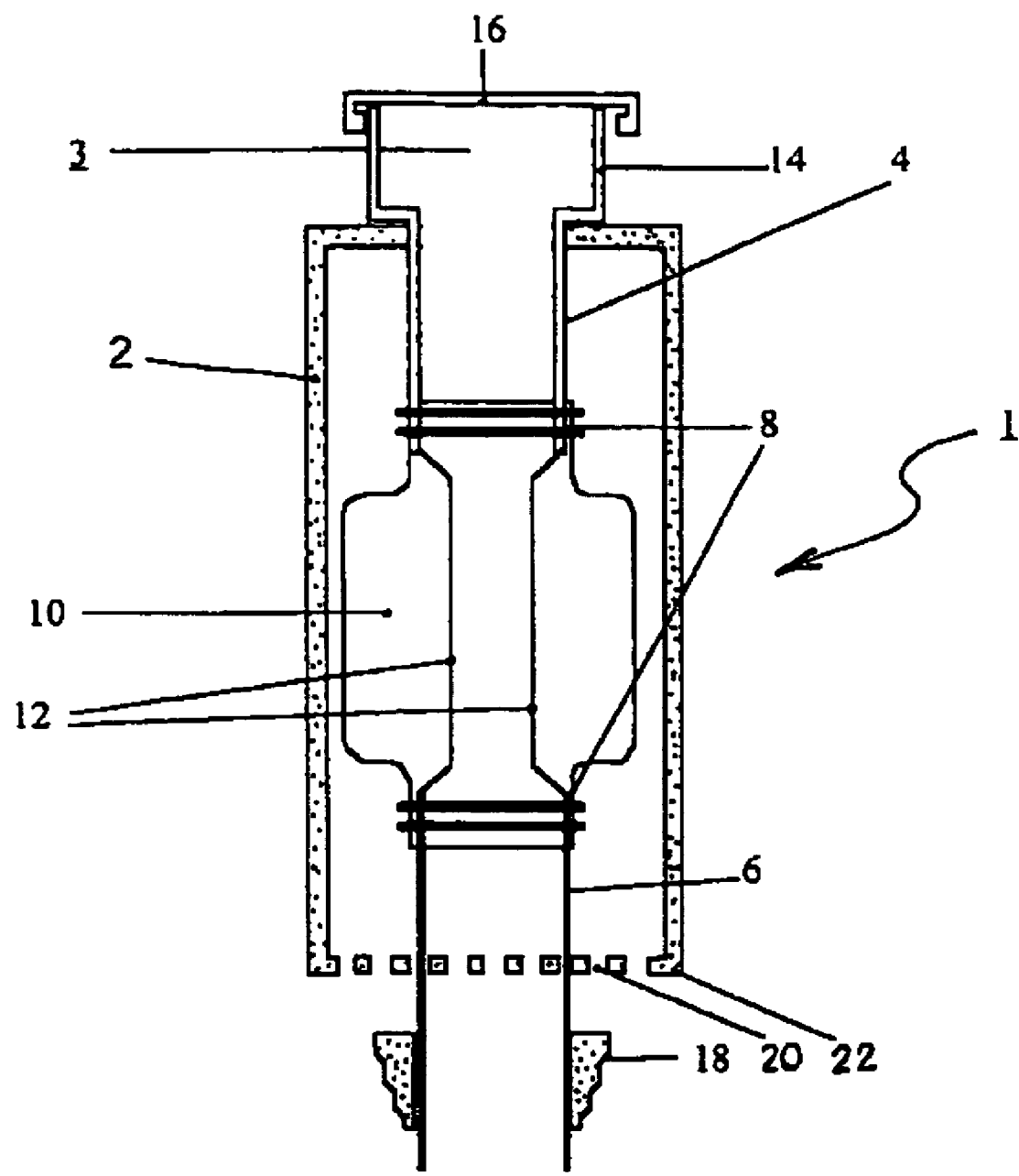
FIG. 1 is a cross section through a positive air pressure attenuation device.

In the drawings, the positive air pressure attenuation device 1 comprises an external casing 2, a housing 3, a flexible reservoir 10 and an end cap 16. FIG. 1 shows the assembled positive air pressure attenuation device. The flexible reservoir 10 covers the central portion of the housing and is secured to the housing inlet 6 and the housing outlet 4 by means of an 'O' ring 8. The flexible reservoir 10 is sealed against the housing inlet 6 and the housing outlet 4 by the 'O' ring compressing a layer of sealant (not shown). This allows the flexible reservoir 10 to operate without any leakage.

The inlet 6 and the outlet 4 of the housing 3 are linked together by means of separator plates 12 leaving between them open spaces in contact with the flexible reservoir 10.

The external casing 2 fits partly over the housing 3 and over the flexible reservoir 10. The external casing has a plurality of means for ventilation 20, shown for example here in the base surface 22, which allows the flexible reservoir 10 to be in permanent contact with the atmospheric air (pressure) whilst preventing the flexible reservoir 10 from being damaged by any external event.

The positive air pressure attenuation device 1 is attached to the drainage system by means of a graduated connector 18. The graduated connector allows the connection of at least two different sized pipes together in a secure manner, and may be made of elastomeric material.

Figure 2:
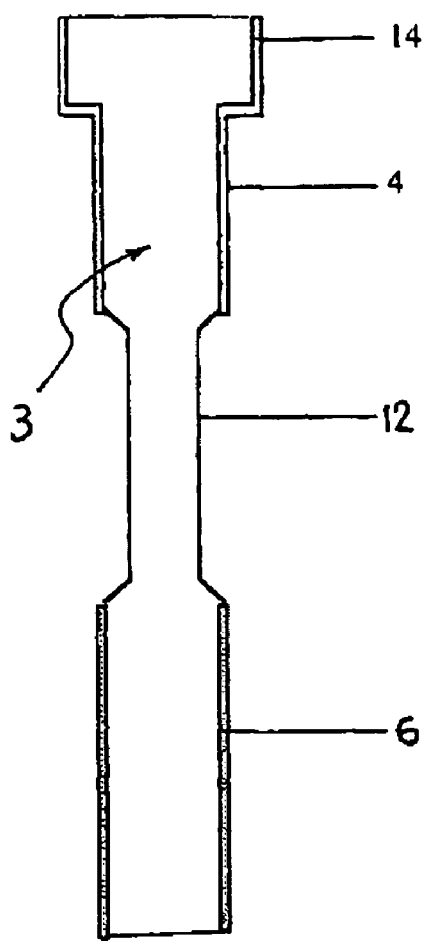
FIG. 2 is a cross section through the housing.

In FIG. 2, the housing 3 can be seen to comprise four distinct sections. The upper section 14 leads to the housing outlet 4 and the housing inlet 6 via the separator sections or plates 12. The separator plates 12 allow airflow to continue through the positive air pressure attenuation device 1 when the flexible reservoir 10 is fully collapsed.

Figure 3:
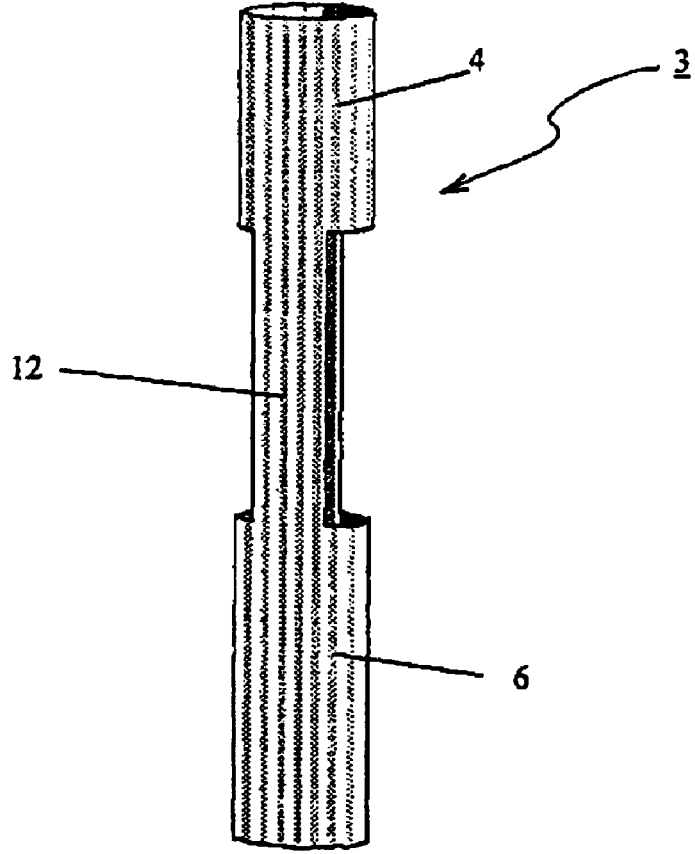
FIG. 3 is a schematic of the housing.

FIG. 3 is a schematic of the housing 3 without the upper section 14. It can be seen that the separator plates 12 do not extend fully round the circumference of the housing 3. The gaps between the separator plates 12 allow air from the drainage system to enter the flexible reservoir 10 and inflate it in case of positive pressure within the system, thus absorbing the energy of the transient pressure wave.

Figure 4:
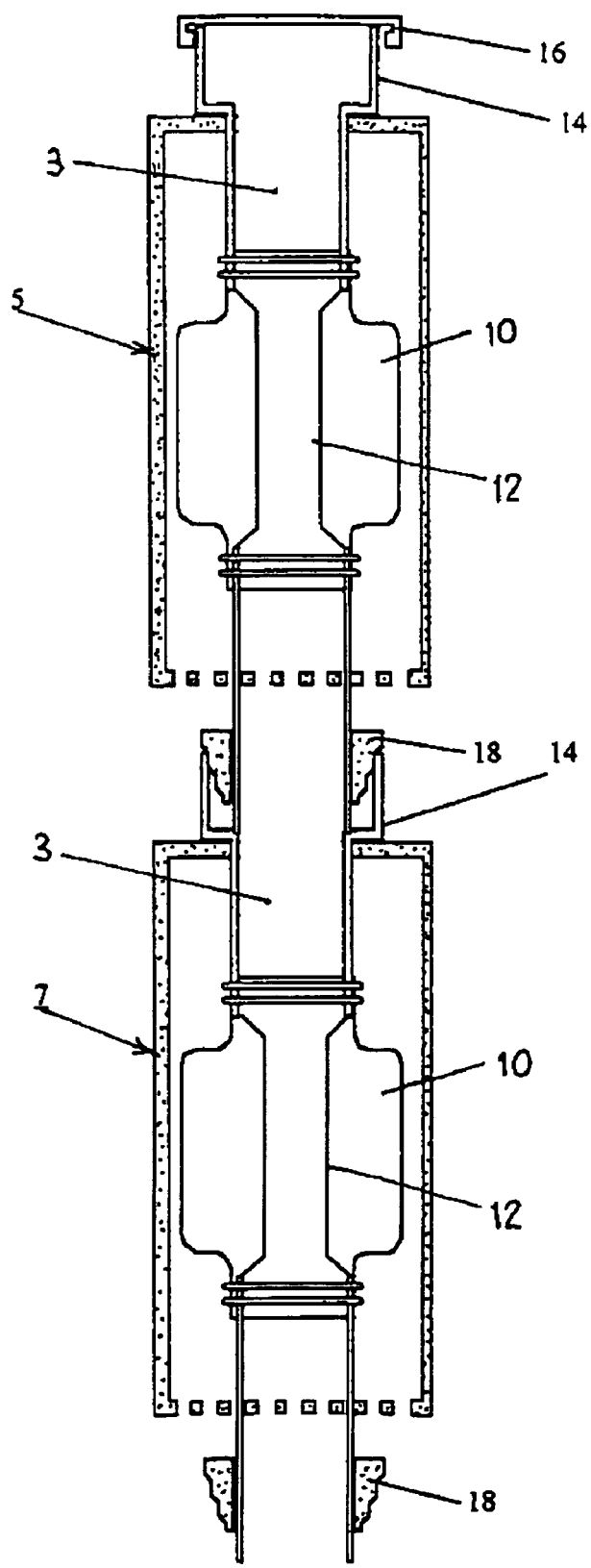
FIG. 4 is a cross section of two positive air pressure attenuation devices connected in series.

FIG. 4 shows two positive air pressure attenuation devices 1 connected in series. The devices are connected together by means of a graduated connector 18 connecting them, housing inlet 6 of the upper positive air pressure attenuation device 5 into the upper section 14 of the lower positive air pressure attenuation device 7.

Figure 5:
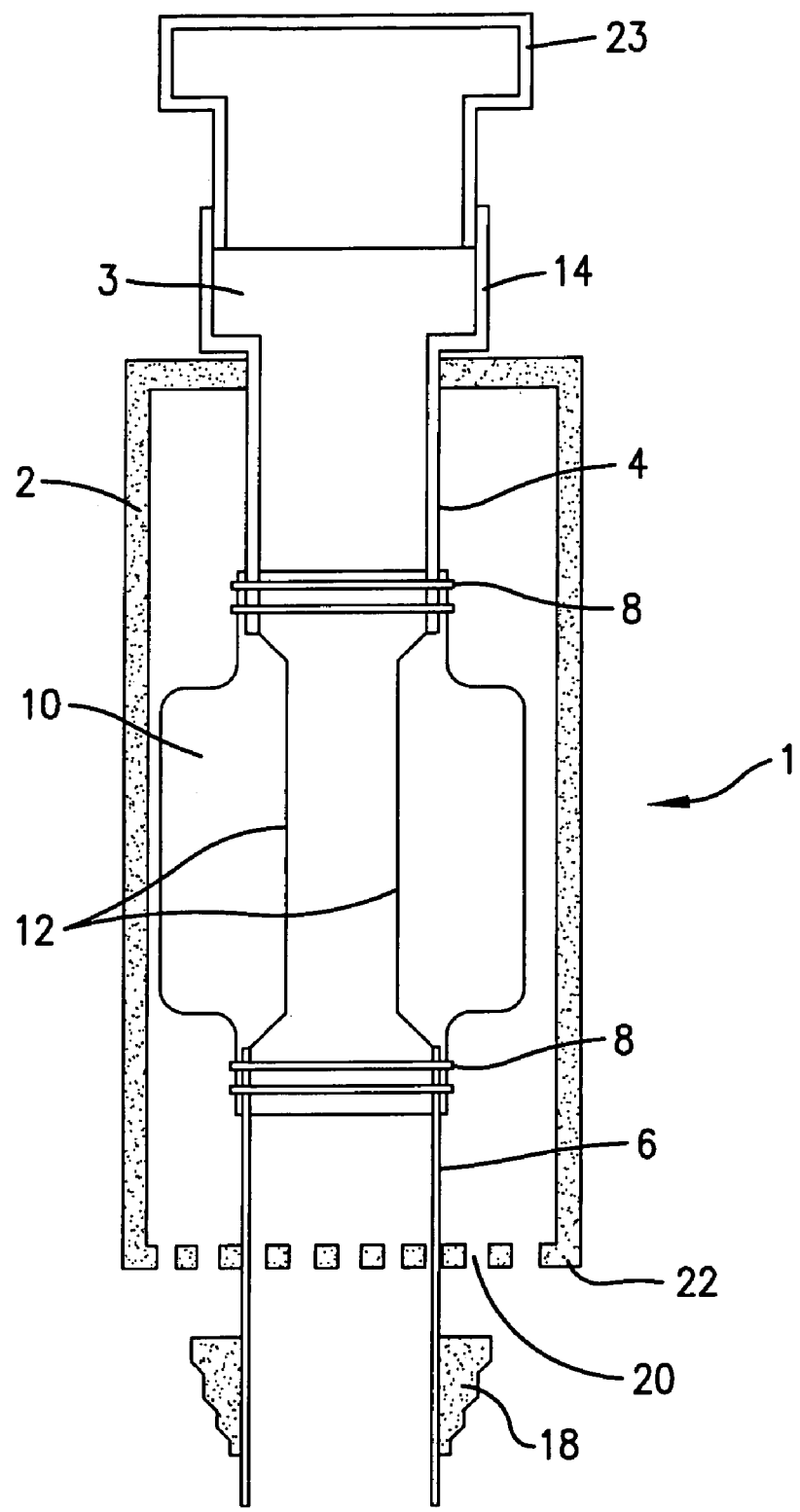
FIG. 5 is a cross section through a positive air pressure attenuation device connected to an air admittance valve, shown schematically.

The connection between two positive air pressure attenuation devices, or a positive air pressure attenuation device and the drainage system, or a positive air pressure attenuation device and an air admittance valve 23 as shown in FIG 5, is intended to be a push fit connection.

The ground drainage system is designed to be in accordance with BS 5572: 1978 (Code of Practice for Sanitary Pipe Work).

With the present invention, a simple and effective positive air pressure attenuation device, that can be retrofitted to existing drainage systems, is provided.

While only a specific embodiment of the present invention have been described and shown, it is apparent that various alterations and modifications can be made therein. It is therefore the intention in the appended claims to cover all such modifications and alterations as may fall within the scope of the claims.

We claim:

1. A positive air pressure attenuation device specifically adapted for use in a drainage system of a building, the device comprising:
    a housing including structure for connecting the housing to the system and having an inlet defined by an inlet area, said structure being located proximate said inlet area, an outlet defined by an outlet area, and a central portion, the inlet area being linked to the outlet area by means of a separator located in the central portion of the housing;
    a flexible reservoir secured to the housing, the flexible reservoir being operable on a positive air pressure transient within the drainage system; and
    an external casing covering the flexible reservoir and at least a part of the housing, said casing presenting an air-admitting passageway so that the flexible reservoir is in permanent contact with atmospheric air during operation of the device.

2. A positive air pressure attenuation device as claimed in claim 1, wherein the passageway presented by the external casing comprises a plurality of ventilation passageways in the casing which allows the flexible reservoir to be in permanent contact with atmospheric air whilst protecting the flexible reservoir from being damaged.

3. A positive air pressure attenuation device as claimed in claim 2, wherein the flexible reservoir is made from butyl rubber.

4. A positive air pressure attenuation device as claimed in claim 2, wherein the external casing is cylindrical and the ventilation means are provided in a base surface of the casing.

5. A positive air pressure attenuation device as claimed in claim 2, wherein the housing includes an upper section which can be sealed off with an end cap.

6. A positive air pressure attenuation device as claimed in claim 2, wherein the flexible reservoir covers the central portion of the housing including the separator and is secured to each of the inlet and the outlet by a securing means.

7. A positive air pressure attenuation device as claimed in claim 6, wherein the flexible reservoir is made from butyl rubber.

8. A positive air pressure attenuation device as claimed in claim 6, wherein the external casing is cylindrical and the ventilation means are provided in a base surface of the casing.

9. A positive air pressure attenuation device as claimed in claim 6, wherein the housing includes an upper section which can be sealed off with an end cap.

10. A positive air pressure attenuation device as claimed in claim 6, wherein the securing means comprise one 'O' ring.

11. A positive air pressure attenuation device as claimed in claim 10, wherein the securing means is used in conjunction with a sealing means.

12. A positive air pressure attenuation device as claimed in claim 6, wherein the securing means is used in conjunction with a sealing means.

13. A positive air pressure attenuation device as claimed in claim 12, wherein the sealing means includes an uncured butyl rubber and solvent paste.

14. A positive air pressure attenuation device as claimed in claim 12, wherein the external casing is cylindrical and the ventilation means are provided in a base surface of the casing.

15. A positive air pressure attenuation device as claimed in claim 12, wherein the housing includes an upper section which can be sealed off with an end cap.

16. A positive air pressure attenuation device as claimed in claim 1 wherein the flexible reservoir is made from butyl rubber.

17. A positive air pressure attenuation device as claimed in claim 1 wherein the external casing is cylindrical and ventilation means are provided in a base surface of the casing.

18. A positive air pressure attenuation device as claimed in claim 1 wherein the housing includes an upper section which can be sealed off with an end cap.

19. A drainage system comprising at least one positive air pressure attenuation device as claimed in claim 1.

20. A drainage system as claimed in claim 19 also comprising, in combination, at least one air admittance valve responding to conditions of reduced or negative pressure in the system.

* * * * *